June 25, 1935.  G. O. JOHNSON  2,005,941

FLYWHEEL MOUNTING

Filed Dec. 5, 1934  2 Sheets-Sheet 1

INVENTOR.
Gustaf O. Johnson
BY Chappell V Earl
ATTORNEYS

June 25, 1935.  G. O. JOHNSON  2,005,941
FLYWHEEL MOUNTING
Filed Dec. 5, 1934  2 Sheets-Sheet 2
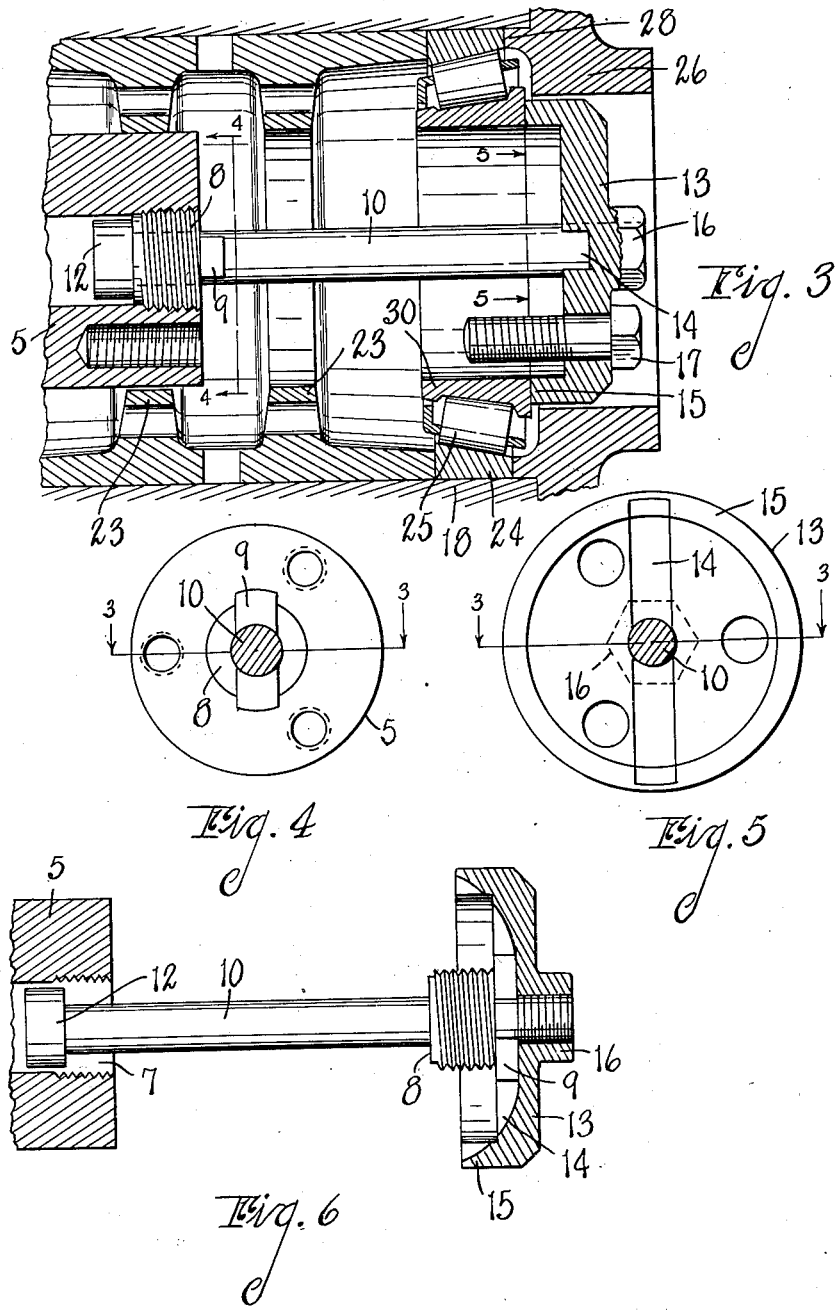
INVENTOR.
Gustaf O. Johnson
BY Chappell & Earl
ATTORNEYS Patented June 25, 1935

2,005,941

UNITED STATES PATENT OFFICE 2,005,941

FLYWHEEL MOUNTING

Gustaf O. Johnson, Elkhart, Ind., assignor to Loshbough-Jordan Tool & Machine Co., Elkhart, Ind.

Application December 5, 1934, Serial No. 756,115

20 Claims. (Cl. 308—211)

The main objects of this invention are:

First, to provide an improved assembly embodying a flywheel mounted for rotation on the end of a crankshaft, the flywheel and shaft being adapted to be connected by means of an intermittently operative clutch.

Second, to provide means in an assembly of the foregoing character for supporting the flywheel on the shaft while partially withdrawn therefrom to facilitate servicing of the clutch.

Third, to provide means for preventing the accidental complete withdrawal of the flywheel from the end of the shaft.

Objects relating to details and economies of my invention will appear from the description to follow. The invention is defined and pointed out in the claims.

A structure which is a preferred embodiment of my invention is illustrated in the accompanying drawings, in which:

Fig. 3 is an enlarged fragmentary longitudinal section on line 3—3 of Figs. 4 and 5, and showing the flywheel partially withdrawn from the crankshaft.

Fig. 4 is a transverse view partially in section on line 4—4 of Fig. 3.

Fig. 5 is a transverse view partially in section on line 5—5 of Fig. 3.

Fig. 6 is a fragmentary view partially in side elevation and partially in longitudinal section of certain of the parts disassembled relative to the shaft.

Figure 1:
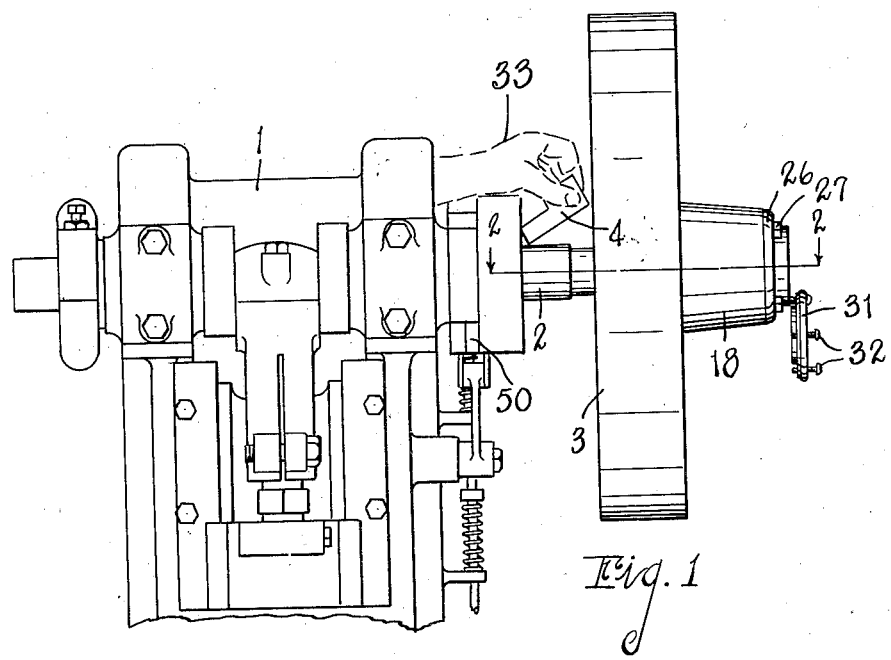
Fig. 1 is a fragmentary view in front elevation of a punch press embodying features of my invention, the hub closure being opened and the flywheel partially withdrawn from the crankshaft to facilitate servicing the clutch.
Figure 2:
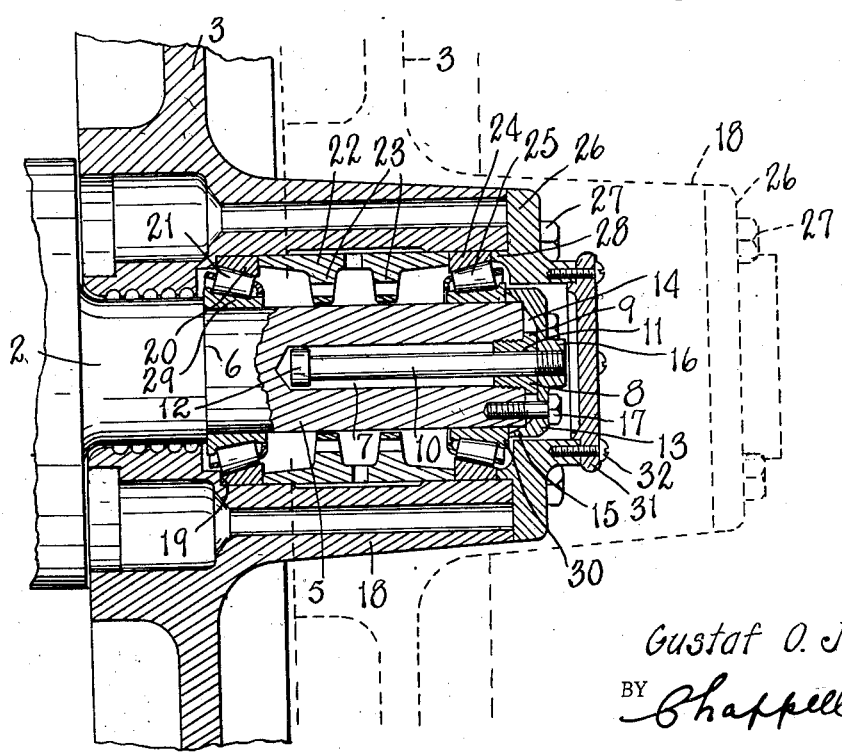
Fig. 2 is an enlarged fragmentary longitudinal section taken on a line corresponding to line 2—2 of Fig. 1, the dotted lines showing the flywheel partially withdrawn from the crankshaft.

Referring to the drawings, 1 in general is a punch press having a crankshaft 2 provided with a flywheel 3 rotatably mounted on one end thereof and adapted to be intermittently connected thereto by means of a clutch designated generally by the numeral 50 and including the clutch elements 4. The flywheel runs freely on the shaft except when the clutch is engaged.

The flywheel is relatively heavy, and in the past in servicing the clutch it has been necessary, or at least the desirable practice has been, to use a crane to support the flywheel, the flywheel being completely withdrawn from the end of the shaft. This prior practice was dangerous and expensive, and I therefore aim to completely avoid it. My arrangement is such that the flywheel may be partially withdrawn from the shaft, as shown by Fig. 1, to manipulate the clutch member 4 while the flywheel is supported by the shaft. In this way, the clutch may be serviced even by the operator of the machine in a quick, safe and economical manner.

I provide the shaft 2 with an end or spindle portion 5 having an annular shoulder 6 at its inner end. The shaft portion 5 also has an axial bore 7 in the outer end of which is threaded a nut 8 having an outer cross tongue 9. The pin 10 extends through the axial hole 11 in the nut 8 and has an inner end flange 12 constituting a stop adapted to coact with the nut 8 to limit the outward movement of the pin.

To the outer end of the pin 10 I thread an end cap 13 having an inner cross groove or slot 14, an inturned rim or peripheral flange 15 and a hexagonal head 16. The end cap is fixed to the pin by any suitable means, such as welding, after the parts have been threaded together. The inturned flange 15 of the end cap is telescoped over the outer end of the shaft, as shown, the end cap being releasably secured to the end of the shaft by means of the cap screws 17.

The flywheel has a hub 18 provided with an internal annular flange 19 spaced from its outer end and constituting an abutment for the outer ring or race 20 of the inner roller bearing 21. A sleeve 22 is telescoped within the hub with its inner end abutting the ring 20, the sleeve having spaced internal annular temporary supports or flanges or ribs 23 normally slightly spaced from the end portion 5 of the shaft 2. The outer ring 24 of the outer roller bearing 25 abuts the outer end of the sleeve, the latter being clamped between the outer rings of the bearings by means of an annular end member or hub cap 26 bolted at 27 to the outer end of the hub and having an inwardly extending annular flange 28 abutting the outer ring of the outer bearing.

The inner and outer roller bearings have inner rings or races 29 and 30 sleeved on the end portion 5 of the shaft for longitudinal sliding movement or adjustment thereon, the inner ring of the inner bearing abutting the annular shoulder 6 of the shaft, and the inner ring of the outer bearing abutting the inturned rim flange 15 of the end cap 13. The end cap thus acts to hold the flywheel in place on the end portion 5 of the shaft.

The closure 31 of the hub cap 26 is removably secured by the screws 32 and acts to close the interior of the hub and retain a lubricant (not shown) therein. The cap screws 17 are made accessible through the hub cap 26 by opening the closure 31 as shown by Fig. 1.

The cap screws 17 are unscrewed from the end of the shaft to release the end cap 13, thus permitting the flywheel to be moved longitudinally of the shaft to partially withdraw the same, such movement being limited by the engagement of the inner end flange 12 of the pin 10 with the nut 8 to prevent the accidental complete withdrawal of the flywheel from the shaft. The internal annular supports 23 of the sleeve 22 coact with the shaft to hold up the flywheel when the latter is partially withdrawn to such an extent that the inner ring of the outer bearing is clear of the outer end of the shaft as shown by Fig. 3. With the flywheel in this position, the operator 33 may remove or insert the clutch elements 4 without using a crane to hold up the flywheel or requiring extra labor to remove the latter. The temporary supports 23 are slightly spaced from the end portion 5 of the shaft during the normal operation of the latter, but in partially withdrawing the flywheel, these temporary supports rest on the shaft, as shown by Fig. 3, allowing the operator to manipulate the flywheel longitudinally of the shaft.

Ordinarily, without using a crane, an attempt to partially withdraw the flywheel from the shaft would be extremely dangerous owing to the fact that the flywheel being heavy is liable to slide clear off the shaft, but I have entirely eliminated this hazard by the provision of the nut 8 and pin 10. The pin is fastened to the end cap which is held in place by the cap screws 17 as pointed out above, the cap screws when drawn up tight holding the parts in proper position so that the flywheel cannot come off the shaft under any circumstances. However, when a clutch element has to be removed for repairs or replacement or for any reason, it is only necessary to take out the cap screws and then pull out the wheel, allowing the stop pin to slide out of the retaining nut until its stop 12 engages the coacting stop 8, positively preventing the accidental complete withdrawal of the wheel from the shaft. The wheel cannot slide or drop off the shaft, but will be supported by the shaft while the clutch elements are removed, replaced or renewed. When this has been accomplished, it is only necessary to push the wheel back and screw in the cap screws, thereby restoring the wheel to the normal or operative position.

If for some reason the wheel is to be taken from the shaft, the closure 31 is removed and the cap screws 17 are unscrewed from the end of the shaft. Next, without pulling out the end cap 13, the latter is turned by means of the hexagonal head 16 to unscrew the stop nut 8 from the bore 7, the connection between the end cap and nut being provided by the cross groove or slot 14 and tongue 9. The whole assembly is thus released from the shaft so that the flywheel can be removed, leaving the bearings in place in the hub.

From the foregoing description of my invention, it will be apparent to those skilled in the art that I provide a flywheel mounting which is simple and economical in its parts, and very efficient and effective for the purpose intended. The arrangement is such that the clutch may be serviced by an unskilled operator without danger, and further, in case of need, the flywheel may be easily and quickly removed entirely from the shaft.

I have illustrated and described my improvements in an embodiment which I have found very practical. I have not attempted to illustrate or describe other embodiments or adaptations as it is believed this disclosure will enable those skilled in the art to embody or adapt my improvements as may be desired.

Although I have shown and described a certain specific embodiment of my invention, I am fully aware that many modifications thereof are possible. My invention is therefore not to be restricted except in so far as is necessitated by the prior art and by the spirit of the appended claims.

Having thus described my invention, what I claim as new and desire to secure by Letters Patent is:

1. The combination of a shaft having an end portion provided with an annular shoulder at its inner end and an axial bore, a nut threaded in the outer end of said bore and having an axial hole, a pin extending through said hole and having a stop adapted to coact with said nut to limit the outward movement of the pin, an end cap threaded to the outer end of said pin and having an inturned rim flange fitting over the outer edge of said shaft, cap screws connecting said end cap to the outer end of said shaft, a flywheel having a hub provided with an internal annular flange spaced from its outer end, an inner roller bearing having an outer ring abutting said hub flange, a sleeve telescoped within said hub with its inner end abutting said ring and having spaced internal annular temporary supports normally spaced from said shaft, an outer roller bearing having an outer ring abutting the outer end of said sleeve, an annular end member bolted to the outer end of said hub and having an inwardly extending annular flange abutting the outer ring of said outer roller bearing and acting to clamp said sleeve between said outer rings, said inner and outer roller bearings having inner rings sleeved on the end portion of said shaft for longitudinal movement, the inner ring of the inner roller bearing abutting said annular shoulder and the inner ring of the outer roller bearing abutting the inturned rim flange of said end cap, and a closure removably mounted on the said annular end member, said cap screws being made accessible for releasing said end cap from said shaft by the opening of said closure, the release of said end cap permitting the flywheel to be moved longitudinally of the shaft, such movement being limited by the engagement of the stop of said pin with said nut to prevent the accidental complete withdrawal of the flywheel from the shaft, said internal annular supports coacting with the shaft to support the flywheel when the latter is partially withdrawn to such an extent that the inner ring of the outer roller bearing is clear of the outer end of the shaft.

2. The combination of a shaft having an end portion provided with an annular shoulder at its inner end and an axial bore, a nut threaded in the outer end of said bore and having an axial hole, a pin extending through said hole and having a stop adapted to coact with said nut to limit the outward movement of the pin, an end cap threaded to the outer end of said pin and having an inturned rim flange fitting over the outer edge of said shaft, cap screws connecting said end cap to the outer end of said shaft, a flywheel having a hub provided with an internal annular flange spaced from its outer end, an inner roller bearing having an outer ring abutting said hub flange, a sleeve telescoped within said hub with its inner end abutting said ring and having spaced internal annular temporary supports normally spaced from said shaft, an outer roller bearing having an outer ring abutting the outer end of said sleeve, and an annular end member bolted to the outer end of said hub and having an inwardly extending annular flange abutting the outer ring of said outer roller bearing and acting to clamp said sleeve between said outer rings, said inner and outer roller bearings having inner rings sleeved on the end portion of said shaft for longitudinal movement, the inner ring of the inner roller bearing abutting said annular shoulder and the inner ring of the outer roller bearing abutting the inturned rim flange of said end cap.

3. The combination of a shaft having an end portion provided with a stop at its inner end and an axial bore, closure means in the outer end of said bore and having an axial hole, a pin extending through said hole and having a stop adapted to coact with said closure means to limit the outward movement of the pin, an end cap fixed to the outer end of said pin and having an inturned rim flange fitting over the outer edge of said shaft, means releasably connecting said end cap to the outer end of said shaft, a flywheel having a hub provided with a stop spaced from its outer end, an inner bearing having an outer ring abutting said hub stop, a sleeve telescoped within said hub with its inner end abutting said ring and having an internal annular support normally spaced from said shaft, an outer bearing having an outer ring abutting the outer end of said sleeve, and an annular end member releasably connected to the outer end of said hub and having an inwardly extending annular flange abutting the outer ring of said outer bearing and acting to clamp said sleeve between said outer rings, said inner and outer bearings having inner rings sleeved on the end portion of said shaft for longitudinal movement, the inner ring of the inner bearing abutting said shaft stop and the inner ring of the outer bearing abutting the inturned rim flange of said end cap, the release of said end cap permitting the flywheel to be moved longitudinally of the shaft, such movement being limited by the engagement of the stop of said pin with said closure means to prevent the accidental complete withdrawal of the flywheel from the shaft, said internal annular support coacting with the shaft to support the flywheel when the latter is partially withdrawn to such an extent that the inner ring of the outer bearing is clear of the outer end of the shaft.

4. The combination of a shaft having an end portion provided with a stop at its inner end and an axial bore, closure means in the outer end of said bore and having an axial hole, a pin extending through said hole and having a stop adapted to coact with said closure means to limit the outward movement of the pin, an end cap fixed to the outer end of said pin and having an inturned rim flange fitting over the outer edge of said shaft, means releasably connecting said end cap to the outer end of said shaft, a flywheel having a hub provided with a stop spaced from its outer end, an inner bearing having an outer ring abutting said hub stop, a sleeve telescoped within said hub with its inner end abutting said ring, an outer bearing having an outer ring abutting the outer end of said sleeve, and an annular end member releasably connected to the outer end of said hub and having an inwardly extending annular flange abutting the outer ring of said outer bearing and acting to clamp said sleeve between said outer rings, said inner and outer bearings having inner rings sleeved on the end portion of said shaft for longitudinal movement, the inner ring of the inner bearing abutting said shaft stop and the inner ring of the outer bearing abutting the inturned rim flange of said end cap, the release of said end cap permitting the flywheel to be moved longitudinally of the shaft, such movement being limited by the engagement of the stop of said pin with said closure means to prevent the accidental complete withdrawal of the flywheel from the shaft.

5. The combination of a shaft having an end portion provided with an axial bore, said bore having restricted means provided with an axial hole, a pin extending through said hole and having a stop adapted to coact with said restricted means to limit the outward movement of the pin, an end cap fixed to the outer end of said pin and having an inturned rim flange fitting over the outer edge of said shaft, means connecting said end cap to the outer end of said shaft, a flywheel having a hub, an inner bearing, a sleeve telescoped within said hub and having an internal support normally spaced from said shaft, an outer bearing, an annular end member on the outer end of said hub, said inner and outer bearings being mounted on the end portion of said shaft for longitudinal movement, and a closure removably mounted on the said annular end member, said cap connecting means being made accessible for releasing said end cap from said shaft by the opening of said closure, the release of said end cap permitting the flywheel to be moved longitudinally of the shaft, said internal support coacting with the shaft to support the flywheel when the latter is partially withdrawn.

6. The combination of a shaft having an end portion provided with an axial bore, said bore having restricted means provided with an axial hole, a pin extending through said hole and having a stop adapted to coact with said restricted means to limit the outward movement of the pin, an end cap fixed to the outer end of said pin, means connecting said end cap to the outer end of said shaft, a flywheel having a hub, an inner bearing, a sleeve telescoped within said hub and having an internal support normally spaced from said shaft, an outer bearing, and an annular end member on the outer end of said hub, said inner and outer bearings being mounted on the end portion of said shaft for longitudinal movement.

7. The combination of a shaft having an end portion provided with an annular shoulder at its inner end, a flywheel having a hub provided with an internal annular flange spaced from its outer end, an inner roller bearing having an outer ring abutting said hub flange, a sleeve telescoped within said hub with its inner end abutting said ring and having an internal annular support normally spaced from said shaft, an outer roller bearing having an outer ring abutting the outer end of said sleeve, means acting to longitudinally clamp said outer rings and sleeve together and against said hub flange, said roller bearings having inner rings sleeved on the end portion of said shaft for longitudinal movement, the inward movement of the flywheel assembly being limited by the engagement of the inner ring of the inner roller bearing with said annular shoulder, and an end cap releasably connected to the outer end of said shaft and having an inturned rim flange engaging the inner ring of the outer bearing, the release of said end cap permitting the flywheel to be moved outwardly longitudinally of the shaft, said internal support coacting with the shaft to support the flywheel when the latter is partially withdrawn to such an extent that the inner ring of the outer roller bearing is clear of the shaft.

8. The combination of a shaft having an end portion provided with an annular shoulder at its inner end, a flywheel having a hub provided with an internal annular flange spaced from its outer end, an inner bearing having an outer ring abutting said hub flange, a sleeve telescoped within said hub with its inner end abutting said ring and having an internal annular support normally spaced from said shaft, an outer bearing having an outer ring abutting the outer end of said sleeve, means acting to longitudinally clamp said outer rings and sleeve together and against said hub flange, said bearings having inner rings sleeved on the end portion of said shaft for longitudinal movement, the inward movement of the flywheel assembly being limited by the engagement of the inner ring of the inner bearing with said annular shoulder, and an end cap releasably connected to the outer end of said shaft and engaging the inner ring of the outer bearing, the release of said end cap permitting the flywheel to be moved outwardly longitudinally of the shaft, said internal support coacting with the shaft to support the flywheel when the latter is parially withdrawn.

9. The combination of a shaft, a flywheel, an inner bearing, a support within said flywheel normally out of contact with said shaft, an outer bearing, said bearings being sleeved on the end portion of said shaft for longitudinal movement, a member releasably connected to the outer end of said shaft, the release of said member permitting the flywheel assembly to be moved outwardly longitudinally of the shaft, said support coacting with the shaft to hold up the flywheel when the latter is partially withdrawn, and means acting to limit the movement of said flywheel relative to said shaft.

10. The combination of a shaft, a flywheel, an inner bearing, a support within said flywheel normally out of contact with said shaft, an outer bearing, said bearings being sleeved on the end portion of said shaft for longitudinal movement, and a member releasably connected to the outer end of said shaft, the release of said member permitting the flywheel assembly to be moved outwardly longitudinally of the shaft to hold up the flywheel when the latter is partially withdrawn.

11. The combination of a shaft having an axial bore, a flywheel having a hub disposed on said shaft and provided with spaced bearing units, means connecting said bearing units and hub in assembled relation, a nut threaded in the outer end of said bore and having an axial hole and an outer cross tongue, a pin extending through said hole and having stop means engageable with said nut to limit the outward movement of said flywheel, an end cap threaded to the outer end of said pin and having an inner cross groove receiving said cross tongue and an inturned flange engaging the inner ring of the outer one of said bearing units, and releasable means connecting said end cap to the end of said shaft, the release of said last named means permitting the turning of said end cap to screw said nut out of said bore to entirely withdraw said flywheel from said shaft with the bearing units in place in the hub.

12. The combination of a shaft having an axial bore, a flywheel having a hub disposed on said shaft and provided with spaced bearing units, a nut threaded in the outer end of said bore and having an axial hole and an outer cross tongue, a pin extending through said hole and having stop means engageable with said nut to limit the outward movement of said flywheel, a member threaded to the outer end of said pin and having an inner cross groove receiving said cross tongue and an inturned flange engaging the inner ring of the outer one of said bearing units, and releasable means connecting said member to the end of said shaft, the release of said last named means permitting the turning of said member to screw said nut.

13. The combination of a shaft having an axial bore, a flywheel having a hub disposed on said shaft and provided with spaced bearings, the bearings being longitudinally slidable on said shaft, means connecting said bearings and hub in assembled relation, a nut threaded in the outer end of said bore and having an axial hole and an outer cross tongue, a pin extending through said hole and having means at its inner end engageable with said nut to limit the outward movement of said flywheel, a member fixed to the outer end of said pin and having an inner cross groove receiving said cross tongue, and releasable means connecting said member to the end of said shaft, the release of said last named means permitting the turning of said member to screw said nut out of said bore to entirely withdraw said flywheel from said shaft with the bearings in place in the hub.

14. The combination of a shaft having a shoulder spaced from one end and an axial bore, a flywheel having a hub disposed on said shaft and provided with bearings, a nut threaded in the outer end of said bore, a pin extending through said hole and having means at its inner end engageable with said nut to limit the outward movement of said flywhel, an end cap threaded to the outer end of said pin and having an inturned flange engaging the inner ring of the outer one of said bearings, and releasable means connecting said end cap to the end of said shaft, the nut and end cap having co-engaging means, the release of said last named means permitting the turning of said end cap to screw said nut out of said bore to entirely withdraw said flywheel from said shaft with the bearings in place in the hub.

15. The combination of a shaft, a flywheel mounted on said shaft for axial movement thereon and having inner and outer bearing units with an annular support between said bearing units and normally out of contact with the shaft, said shaft having an axial bore, a stop member threaded into said bore, a stop pin slidable in said stop member and provided with a stop coacting with said stop member on said shaft to limit the withdrawal movement of the flywheel, the outer end of said stop pin being detachably secured to the shaft by means of an element overlying said threaded stop member and having detachable engagement therewith whereby the shaft stop member may be removed by the rotation of said pin carrying element, and a hub cap for said flywheel adapted to permit access to the securing means for said stop pin.

16. The combination of a shaft, a flywheel mounted on said shaft for axial movement thereon and having inner and outer bearing units with an annular support between said bearing units and normally out of contact with the shaft, said shaft having an axial bore, a stop member threaded into said bore, and a stop pin slidable in said stop member and provided with a stop coacting with said stop member on said shaft to limit the withdrawal movement of the flywheel, the outer end of said stop pin being detachably secured to the shaft by means of an element overlying said threaded stop member and having detachable engagement therewith whereby the shaft stop member may be removed by the rotation of said pin carrying element.

17. The combination of a shaft, a flywheel mounted on said shaft for axial movement thereon and having inner and outer bearing units with an annular support between said bearing units and normally out of contact with the shaft, said shaft having an axial bore, a stop member threaded into said bore, and a stop pin slidable in said stop member and provided with a stop coacting with said stop member on said shaft to limit the withdrawal movement of the flywheel, the outer end of said stop pin being detachably secured to the shaft.

18. The combination with a shaft, of a flywheel mounted on said shaft for axial movement thereon and having an internal support normally out of contact with the shaft, a stop pin slidably associated with said shaft, said shaft having coacting stop means whereby the complete withdrawal of the flywheel from the shaft is prevented, said support being in supporting engagement with the shaft when the wheel is partially withdrawn, means for detachably securing the outer end of said stop pin to said shaft when the wheel is adjusted to its normal or operative position thereon, and a closure means at the outer end of said wheel normally enclosing said means for securing said stop pin to said shaft but permitting access thereto when the closure means is open.

19. The combination with a shaft, of a flywheel mounted on said shaft for axial movement thereon, a stop pin slidably associated with said shaft, said shaft having coacting stop means whereby the complete withdrawal of the flywheel from the shaft is prevented, means for detachably securing the outer end of said stop pin to said shaft when the wheel is adjusted to its normal or operative position thereon, and a closure means at the outer end of said wheel normally enclosing said means for securing said stop pin to said shaft but permitting access thereto when the closure means is open.

20. The combination with a shaft, of a flywheel mounted on said shaft for axial movement thereon, a stop pin slidably associated with said shaft, said shaft having coacting stop means whereby the complete withdrawal of the flywheel from the shaft is prevented, and means for detachably securing the outer end of said stop pin to said shaft.

GUSTAF O. JOHNSON.